UNITED STATES PATENT OFFICE.

VLADIMIR STANĚK, OF PRAGUE, AUSTRIA-HUNGARY, ASSIGNOR TO CHEMISCHE FABRIK GEDEON RICHTER, OF BUDAPEST, AUSTRIA-HUNGARY.

PROCESS OF MAKING SOLID STABLE COMPOUNDS CONTAINING HYDROGEN PEROXID.

1,045,451. Specification of Letters Patent. Patented Nov. 26, 1912.

No Drawing. Original application filed July 6, 1911, Serial No. 637,176. Divided and this application filed July 18, 1912. Serial No. 710,242.

*To all whom it may concern:*

Be it known that I, VLADIMIR STANĚK, a subject of the Emperor of Austria-Hungary, residing at Prague, Austria-Hungary, have invented certain new and useful Improvements in the Process of Making Solid Stable Compounds Containing Hydrogen Peroxid, of which the following is a specification.

The present application which is a division of my co-pending application for Letters Patent filed July 6, 1911, Serial Number 637,176, relates to the production of solid stable compounds containing hydrogen peroxid.

Tanatar has found that various organic substances combine with hydrogen peroxid to form solid compounds. Such compounds may be formed with urea, acetamid, urethane, succinamid, asparagin, mannite, erythrite, pinacon and betain. All of these compounds behave, in aqueous solution, similar to hydrogen peroxid. However, they also decompose very quickly and for that reason their practical application is virtually impossible, because after a very short time they split up to form water and oxygen. I have found that by the addition of small quantities of acid salts of organic or inorganic acids these compounds become very stable and for that reason are thoroughly suitable for practical application. For the preparation of a stable compound with a high percentage of hydrogen peroxid the urea has proven to be particularly suitable. If urea be treated with a solution of hydrogen peroxid containing 30% $H_2O_2$, on cooling the solution a compound crystallizes out the composition of which may be expressed by the formula:

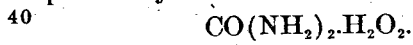

This is an unstable compound, which becomes very stable by the addition thereto of a small quantity of an acid salt. For example, I have found that the addition of 0.3 per cent. of sodium bisulfate is quite sufficient to make the compound stable and to permit of its being preserved for a long time, say 6 months and even longer.

The compound of urea with hydrogen peroxid contains 34 to 35 per cent. $H_2O_2$ (the theory requires 36 per cent.) and is very easily soluble in water. The aqueous solution behaves exactly like a solution of hydrogen peroxid except that by the addition of the substances referred to for rendering the compound stable, its ready tendency to decompose is completely eliminated.

Solid hydrogen peroxid has been on the market for some time, in the form of perborates, persulfates and the like. In all these cases the compounds contain no more than 10 to 11 per cent. of hydrogen peroxid, whereas the compounds with the organic substances mentioned above and made stable according to the present invention, contain about 35 per cent. of hydrogen peroxid Hydrogen peroxid of such high concentration, in solid and stable form has not been known heretofore. By dissolving the preparation a solution of hydrogen peroxid can be readily made at any time, and it is evident that the facility with which the preparation may be shipped from place to place, its high concentration, and the length of time it may be preserved open quite new ways for the general application of hydrogen peroxid.

Example 1: 450 gr. of pulverized urea are introduced in 1000 gr. of an aqueous solution of hydrogen peroxid of 30% $H_2O_2$ while the mass is vigorously stirred. The mixture is then cooled down to freezing point and the crystalline mass obtained is freed from water by suction and afterward intimately mixed with 0.3% of dry sodium bisulfate or potassium bisulfate and ultimately dried at a temperature not exceeding 40° C.

Example 11: 1130 gr. of betain are introduced in an aqueous solution of 1400 gr. of hydrogen peroxid of 30% $H_2O_2$. The solution is weakly acidified and evaporated at a low temperature *in vacuo* until crystallization sets in. The crystallized compound is separated from the mother liquor and made stable by mixing it with 0.3% of sodium bisulfate.

The compound of betain with hydrogen peroxid forms a white crystalline powder easily soluble in water and has the formula

What I claim is:—

1. A process for rendering unstable solid compounds of hydrogen peroxid with organic substances stable which consists in mixing therewith a small quantity of an acid salt.

2. The process herein described of producing a stable compound of hydrogen peroxid and urea, which comprises dissolving urea in hydrogen peroxid in excess and adding a small quantity of an acid salt.

3. The herein described stable compound of hydrogen peroxid and urea containing a small quantity of an acid salt.

In testimony whereof I have affixed my signature in presence of two witnesses.

VLADIMIR STANĚK.

Witnesses:
 JAROSLAV MUHLBAUER,
 FERDINAND SCHULZ.